US012589678B2

(12) United States Patent
Williams

(10) Patent No.: US 12,589,678 B2
(45) Date of Patent: Mar. 31, 2026

(54) CHILD SAFETY SEAT AND RELATED TETHER ASSEMBLY

(71) Applicant: Wonderland Switzerland AG, Steinhausen (CH)

(72) Inventor: Bruce L. Williams, Narvon, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 16/891,093

(22) Filed: Jun. 3, 2020

(65) Prior Publication Data
US 2020/0391625 A1 Dec. 17, 2020

Related U.S. Application Data

(60) Provisional application No. 62/860,398, filed on Jun. 12, 2019.

(51) Int. Cl.
*B60N 2/28* (2006.01)

(52) U.S. Cl.
CPC ......... *B60N 2/2809* (2013.01); *B60N 2/2821* (2013.01); *B60N 2/2845* (2013.01); *B60N 2/2869* (2013.01)

(58) Field of Classification Search
CPC .. B60N 2/2809; B60N 2/2821; B60N 2/2845; B60N 2/2869
See application file for complete search history.

(56) References Cited

U.S. PATENT DOCUMENTS

| 4,641,844 A | 2/1987 | Mar |
| 6,260,920 B1 | 7/2001 | Tolfsen |
| 6,520,579 B2 | 2/2003 | Kassai |

(Continued)

FOREIGN PATENT DOCUMENTS

| AU | 2016256730 A1 | 11/2016 |
| AU | 2011200416 C1 | 9/2019 |

(Continued)

OTHER PUBLICATIONS

Chinese Office Action; Chinese Application No. 202010532093.8; Date: May 7, 2022; 12 pages.

(Continued)

*Primary Examiner* — Philip F Gabler
(74) *Attorney, Agent, or Firm* — CANTOR COLBURN LLP

(57) ABSTRACT

A child safety seat includes a base, a seat body and a tether assembly. The seat body is movably, detachably, or fixedly disposed on the base. The tether assembly is for securing the base on a vehicle. The tether assembly includes a tether driving component, a tether anchor and a tether strap. The tether driving component is movably disposed on the base. The tether driving component is extendable relative to the base to a used position and retractable relative to the base to a stored position. The used position is higher than the stored position along a vertical direction. The tether anchor is for engaging with the vehicle. The tether strap is connected to the tether anchor and one of the base and the tether driving component. The present invention allows an aesthetic design of the base and maintains a lower profile and a lower center of gravity.

24 Claims, 9 Drawing Sheets

(56) References Cited

U.S. PATENT DOCUMENTS

| | | | | |
|---|---|---|---|---|
| 7,322,648 | B2 * | 1/2008 | Nakagawa | B60N 2/2809 297/183.3 |
| 7,357,451 | B2 | 4/2008 | Bendure | |
| 7,533,935 | B2 * | 5/2009 | Mostert | B60N 2/2809 297/254 |
| 7,575,276 | B1 | 8/2009 | Henry | |
| 9,061,611 | B2 * | 6/2015 | Love | B60N 2/2863 |
| 9,415,706 | B2 * | 8/2016 | Rabeony | B60N 2/2809 |
| 9,434,279 | B2 * | 9/2016 | Williams | B60N 2/2821 |
| 10,150,389 | B2 * | 12/2018 | Cohen | B60N 2/2878 |
| 10,780,800 | B2 * | 9/2020 | Kaiser | B60N 2/2824 |
| 2002/0043836 | A1 * | 4/2002 | Maciejczyk | B60N 2/2869 297/250.1 |
| 2002/0145319 | A1 | 10/2002 | Tsugimatsu et al. | |
| 2005/0236877 | A1 | 10/2005 | Hendren et al. | |
| 2008/0296944 | A1 | 12/2008 | Nakagawa et al. | |
| 2009/0091167 | A1 | 4/2009 | Jha et al. | |
| 2011/0109138 | A1 * | 5/2011 | Inoue | B60N 2/286 297/256.13 |
| 2014/0265255 | A1 * | 9/2014 | Wang | B60N 2/2848 280/643 |
| 2014/0284977 | A1 | 9/2014 | Williams | |
| 2015/0336481 | A1 * | 11/2015 | Horsfall | B60N 2/2863 297/256.12 |
| 2016/0332542 | A1 * | 11/2016 | Cohen | B60N 2/2884 |
| 2017/0355287 | A1 | 12/2017 | Anderson et al. | |
| 2018/0022241 | A1 | 1/2018 | Jewkes | |
| 2018/0264977 | A1 | 9/2018 | Anderson | |
| 2018/0361889 | A1 | 12/2018 | Stamper | |
| 2019/0077282 | A1 | 3/2019 | Reaves et al. | |
| 2019/0135142 | A1 | 5/2019 | Jung et al. | |
| 2020/0215941 | A1 | 7/2020 | Resch et al. | |
| 2020/0391627 | A1 | 12/2020 | Williams | |
| 2024/0359604 | A1 | 10/2024 | Williams | |

FOREIGN PATENT DOCUMENTS

| | | | |
|---|---|---|---|
| CA | 3083394 | A1 | 12/2020 |
| CN | 201124777 | Y | 10/2008 |
| CN | 103661023 | A | 3/2014 |
| CN | 204623214 | U | 9/2015 |
| CN | 106671836 | A | 5/2017 |
| CN | 107499195 | A | 12/2017 |
| CN | 107585065 | A | 1/2018 |
| CN | 112078450 | A | 12/2020 |
| DE | 602 12 485 | T2 | 6/2007 |
| DE | 102020115441 | A1 | 12/2020 |
| EP | 1 772 307 | B1 | 5/2012 |
| EP | 2 586 651 | A1 | 5/2013 |
| EP | 2 612 793 | A2 | 7/2013 |
| EP | 3 511 202 | A1 | 7/2019 |
| EP | 3 521 105 | A1 | 8/2019 |
| GB | 2587067 | A | 3/2021 |
| JP | 2007-168580 | A | 7/2007 |
| WO | 2007/121277 | A2 | 10/2007 |
| WO | 2013/082321 | A1 | 6/2013 |
| WO | 2014/000014 | A1 | 1/2014 |
| WO | 2016/183156 | A1 | 11/2016 |

OTHER PUBLICATIONS

Canadian Office Action; Canadian Application No. 3083385; Date: Feb. 3, 2022; 4 pages.

Canadian Office Action; Canadian Application No. 3,083,385; Date: Nov. 25, 2022; 4 pages.

J.K. Office Action; U.K. Application No. GB2008778.9; Date: Nov. 21, 2022; 3 pages.

U.S. Non-Final Office Action; U.S. Appl. No. 17/705,401; Filing Date: Mar. 28, 2022; Notification Date: Nov. 3, 2022; 8 pages.

Chinese Office Action for Chinese Application No. 202010532093.8; Report Mail Date Jan. 2, 20230; Partial Translation (pp. 1-12).

German Office Action for DE Application No. 10 2020 115 441.0; Report Mail Date Apr. 13, 2023 (pp. 1-11; with Machine Translation).

Canadian Office Action; Canadian Application No. 3,083,385; Date: Jun. 21, 2023; 4 pages.

U.S. Non-Final Office Action; U.S. Appl. No. 18/767,009; Filing Date: Jul. 9, 2024; Notification Date: Oct. 1, 2025; 8 pages.

* cited by examiner

CHILD SAFETY SEAT AND RELATED TETHER ASSEMBLY

CROSS REFERENCE TO RELATED APPLICATIONS

This application claims the benefit of U.S. Provisional Application No. 62/860,398, filed on Jun. 12, 2019, and the entire contents of this application are hereby incorporated by reference.

BACKGROUND OF THE INVENTION

1. Field of the Invention

The present invention relates to a child product, and more particularly to a child safety seat and a tether assembly thereof.

2. Description of the Prior Art

With development of the economy and advancement of the technology, there are more and more consumer goods for bringing convenience in people's life. A child safety seat is one of the consumer goods. The child safety seat includes a top tether with a hook to secure the child safety seat in a vehicle for reducing a forward movement of the child safety seat in a crash of the vehicle. The top tether can be attached onto a seat body or a base. When it is desired to attach the top tether onto the base, it requires the base to be tall to provide adequate crash performance. However, the tall base could bring a disadvantage in overall aesthetics of the child car seat and a higher center of gravity.

SUMMARY OF THE INVENTION

Therefore, it is an objective of the present invention to provide a child safety seat and a tether assembly thereof for solving the aforementioned problem.

In order to achieve the aforementioned objective, the present invention discloses a child safety seat. The child safety seat includes a base, a seat body and a tether assembly. The base is installed on a seat of a vehicle. The seat body is movably, detachably, or fixedly disposed on the base and for accommodating a child. The tether assembly is for securing the base on the seat of the vehicle. The tether assembly includes a tether driving component, a tether anchor and a tether strap. The tether driving component is movably disposed on the base. The tether driving component is extendable relative to the base to a used position and retractable relative to the base to a stored position. The used position is higher than the stored position along a vertical direction. The tether anchor is for engaging with the vehicle. The tether strap is connected to the tether anchor and one of the base and the tether driving component.

According to an embodiment of the present invention, the base is formed in an L-shaped structure and includes a first portion and a second portion. The first portion and the second portion respectively abut against a seatback and a seat pan of the seat of the vehicle, and the tether driving component is movably disposed on the first portion of the base.

According to an embodiment of the present invention, an accommodating chamber is formed inside the first portion of the base. An accommodating recess is formed on an upper periphery on the first portion of the base, and the tether driving component is partially received inside the accommodating chamber and partially exposed out of the accommodating recess.

According to an embodiment of the present invention, the tether driving component includes a handle part connected to the tether strap and at least one moving part connected to the handle part. The handle part is exposed out of the accommodating recess. The at least one moving part is at least partially received inside the accommodating chamber and slidable relative to the first portion. A shape of the handle part of tether driving component matches with a shape of the accommodating recess. The handle part covers the accommodating recess when the tether driving component is located at the stored position, and the handle part separates from the accommodating recess when the tether driving component is located at the used position.

According to an embodiment of the present invention, a recess is formed on an outer side of the first portion of the base for accommodating the tether anchor.

According to an embodiment of the present invention, the base further includes at least one lower anchor disposed on a connection of the first portion and the second portion.

According to an embodiment of the present invention, the tether driving component is slidably or pivotally disposed on the base.

According to an embodiment of the present invention, the tether assembly further includes a releasing mechanism for allowing and restraining a sliding movement or a pivoting movement of the tether driving component relative to the base.

According to an embodiment of the present invention, the tether driving component includes a handle part connected to the tether strap and at least one moving part connected to the handle part and slidably or pivotally disposed on the base.

According to an embodiment of the present invention, the tether driving component includes a telescopic part and a handle part. The telescopic part includes a plurality of telescopic portions movably connected to each other in a telescopic manner, and the handle part is connected to the tether strap and one of the plurality of the telescopic portions away from the base.

According to an embodiment of the present invention, the tether strap is extendable and retractable relative to the tether driving component.

In order to achieve the aforementioned objective, the present invention further includes a tether assembly for securing a base of a child safety seat installed on a seat of a vehicle. The tether assembly includes a tether driving component, a tether anchor and a tether strap. The tether driving component is movably disposed on the base. The tether driving component is extendable relative to the base to a used position and retractable relative to the base to a stored position. The used position is higher than the stored position along a vertical direction. The tether anchor is for engaging with the vehicle. The tether strap is connected to the tether anchor and one of the base and the tether driving component.

According to an embodiment of the present invention, the tether driving component is movably disposed on a first portion of the base abutting against a seatback of the seat of the vehicle.

According to an embodiment of the present invention, the tether driving component is partially received inside an accommodating chamber formed inside the base and partially exposed out of an accommodating recess formed on an upper periphery of the base.

According to an embodiment of the present invention, the tether driving component includes a handle part connected to the tether strap and at least one moving part connected to the handle part. The handle part is exposed out of the accommodating recess. The at least one moving part is at least partially received inside the accommodating chamber and slidable relative to the first portion. A shape of the handle part of tether driving component matches with a shape of the accommodating recess. The handle part covers the accommodating recess when the tether driving component is located at the stored position, and the handle part separates from the accommodating recess when the tether driving component is located at the used position.

According to an embodiment of the present invention, the tether driving component is slidably or pivotally disposed on the base.

According to an embodiment of the present invention, the tether assembly further includes a releasing mechanism for allowing and restraining a sliding movement or a pivoting movement of the tether driving component relative to the base.

According to an embodiment of the present invention, the tether driving component includes a handle part connected to the tether strap and at least one moving part connected to the handle part and slidably or pivotally disposed on the base.

According to an embodiment of the present invention, the tether driving component includes a telescopic part and a handle part. The telescopic part includes a plurality of telescopic portions movably connected to each other in a telescopic manner, and the handle part is connected to the tether strap and one of the plurality of the telescopic portions away from the base.

According to an embodiment of the present invention, the tether strap is extendable and retractable relative to the tether driving component.

In summary, in the present invention, the tether driving component is extendable and retractable relative to the base between the used position and the stored position. Therefore, the present invention achieves an aesthetic design of the base and maintains a lower profile and a lower center of gravity while providing a proper height adjustment for crash performance.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 1:
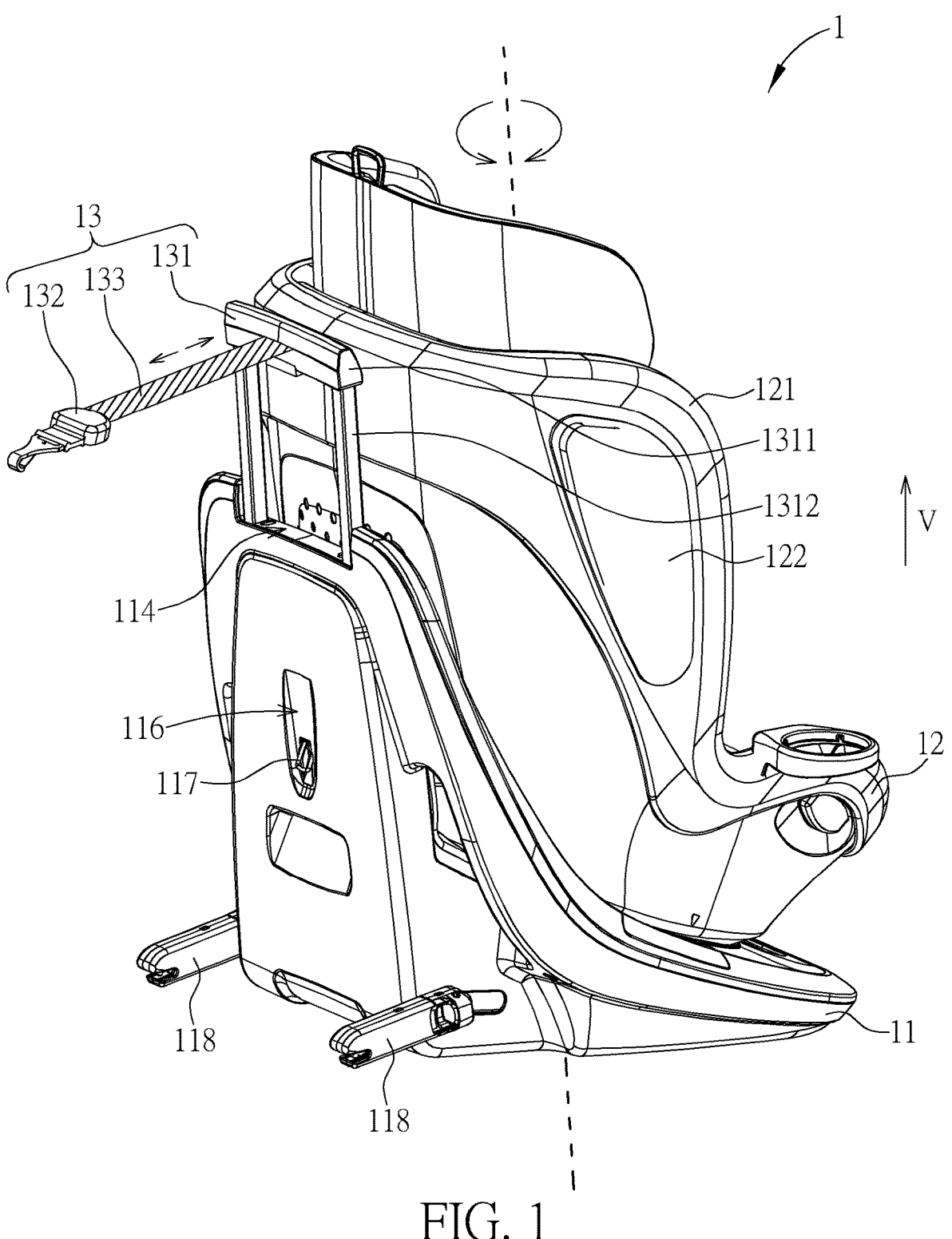
FIG. 1 is a schematic diagram of a child safety seat as a tether assembly is in a used state according to a first embodiment of the present invention.
Figure 2:
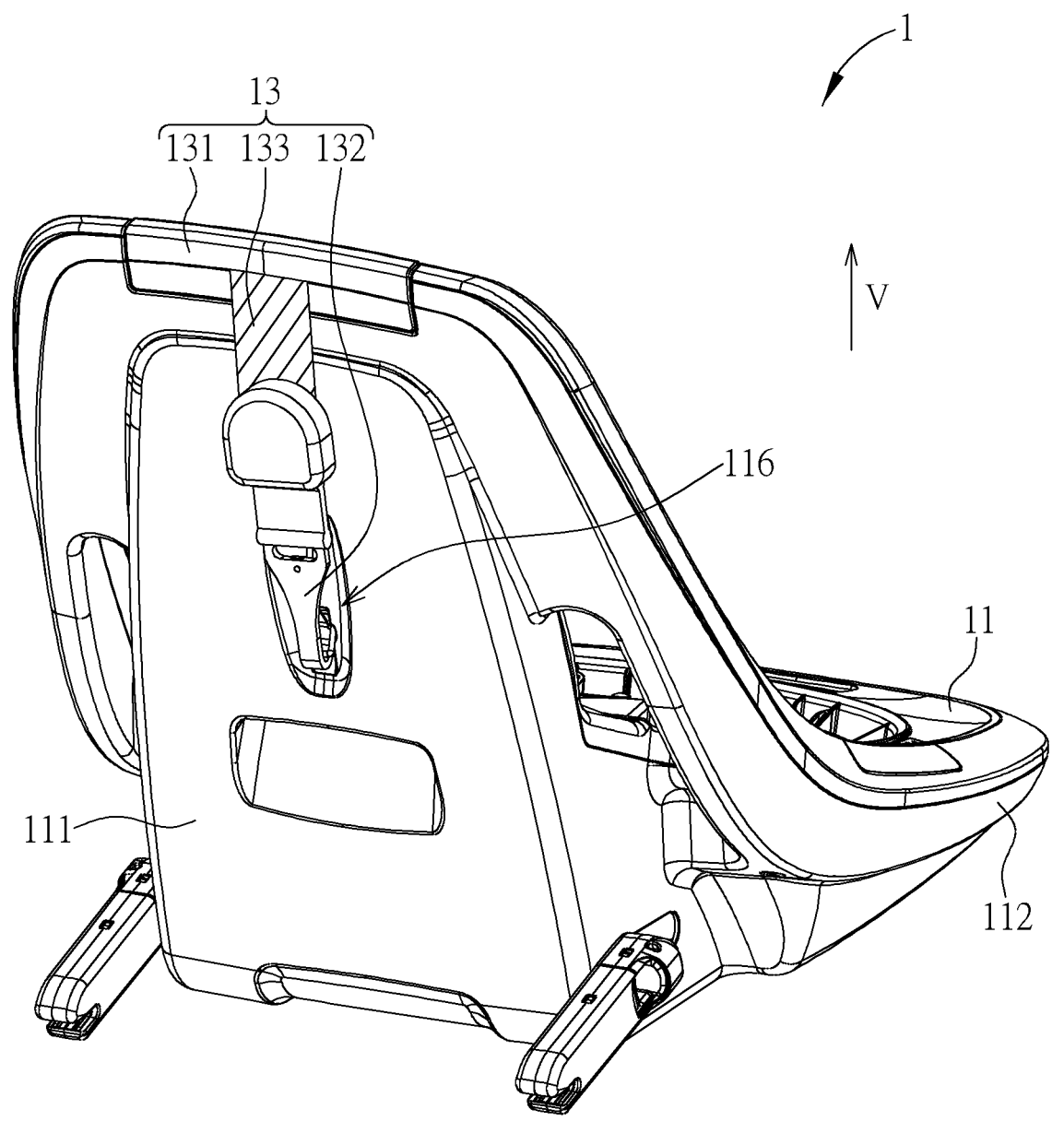
FIG. 2 is a partial diagram of the child safety seat as the tether assembly is in a stored state according to the first embodiment of the present invention.
Figure 3:
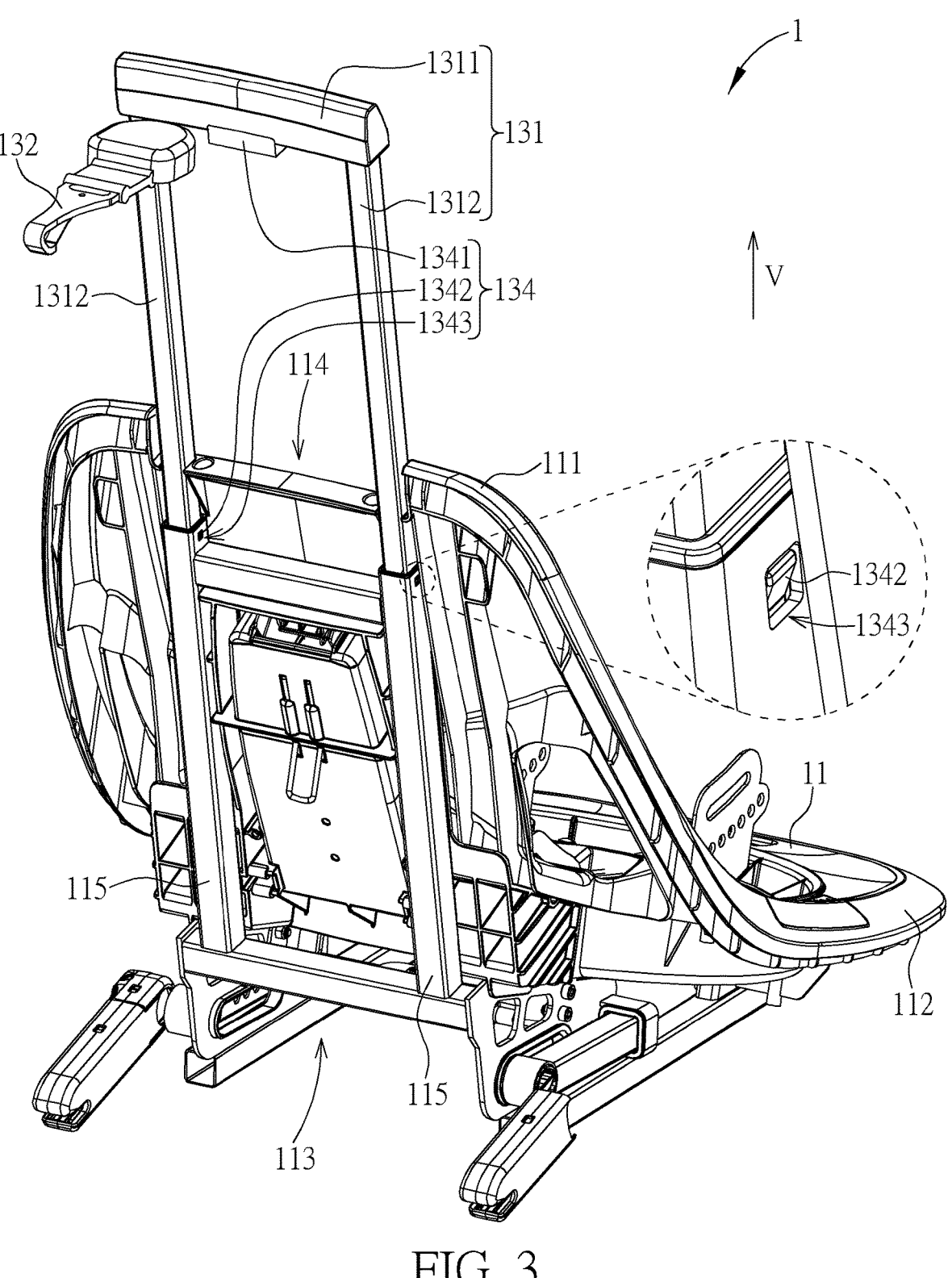
FIG. 3 is a partial internal structural diagram of the child safety seat shown in FIG. 1 according to the first embodiment of the present invention.
Figure 4:
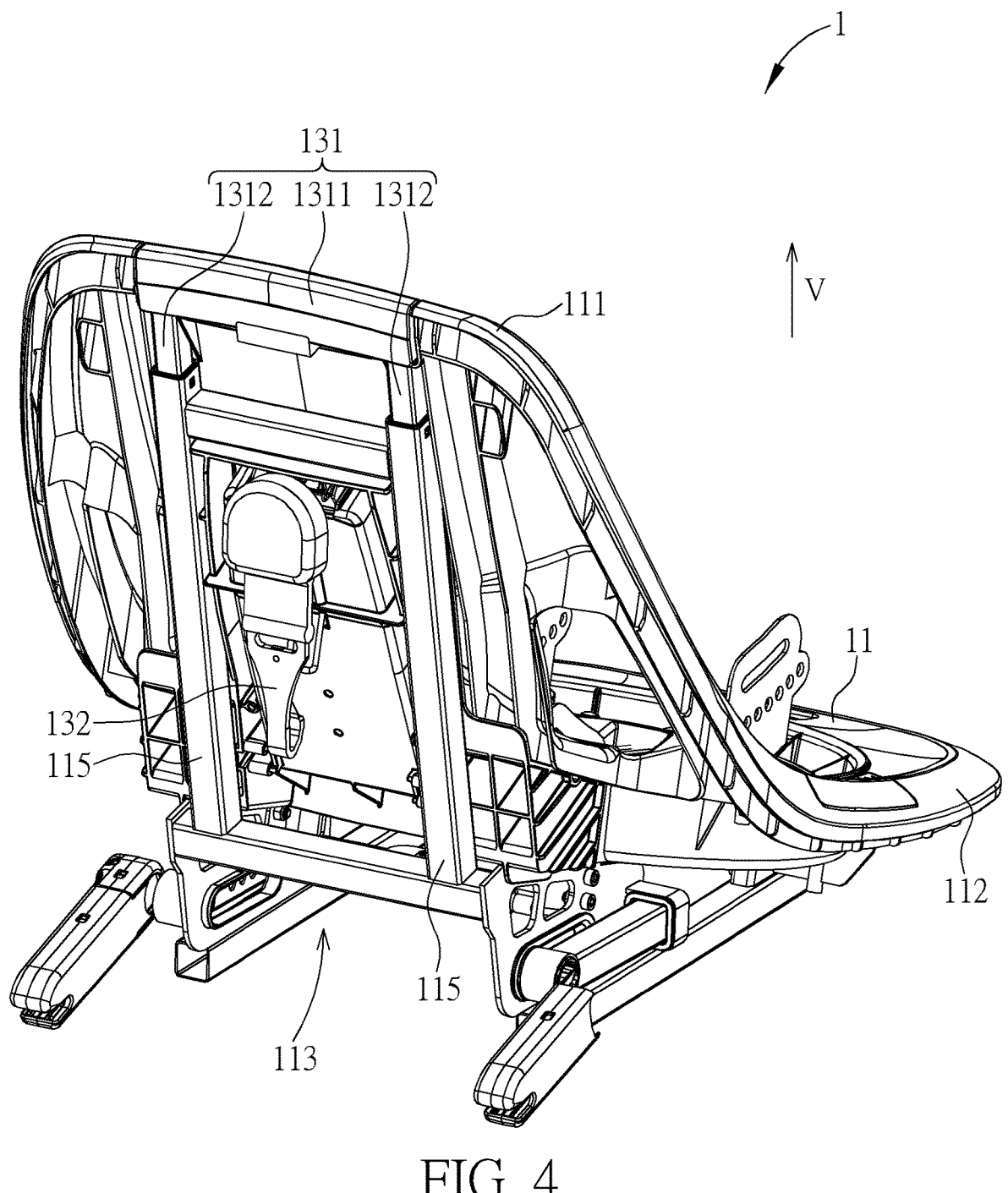
FIG. 4 is a partial internal structural diagram of the child safety seat shown in FIG. 2 according to the first embodiment of the present invention.

Please refer to FIG. 1 to FIG. 4. FIG. 1 is a schematic diagram of a child safety seat 1 as a tether assembly 13 is in a used state according to a first embodiment of the present invention. FIG. 2 is a partial diagram of the child safety seat 1 as the tether assembly 13 is in a stored state according to the first embodiment of the present invention. FIG. 3 is a partial internal structural diagram of the child safety seat 1 shown in FIG. 1 according to the first embodiment of the present invention. FIG. 4 is a partial internal structural diagram of the child safety seat 1 shown in FIG. 2 according to the first embodiment of the present invention. As shown in FIG. 1 to FIG. 4, the child safety seat 1 includes a base 11, a seat body 12 and the tether assembly 13. The base 11 is installed on a seat of a vehicle, which is not shown in the figures. The seat body 12 is movably and detachably disposed on the base 11 and for accommodating a child. Preferably, in this embodiment, the seat body 12 can be installed on the base 11 in a rotatable and detachable manner, and the seat body 12 can be rotated relative to the base 11 between a front-facing position and a rear-facing position when the seat body 12 is installed on the base 11. The tether assembly 13 is for securing the base 11 on the seat of the vehicle. The tether assembly 13 includes a tether driving component 131, a tether anchor 132 and a tether strap 133. The tether driving component 131 is movably disposed on the base 11. The tether driving component 131 is extendable relative to the base 11 to a used position, as shown in FIG. 1 and FIG. 3, and retractable relative to the base 11 to a stored position, as shown in FIG. 2 and FIG. 4. The used position is higher than the stored position along a vertical direction V. The tether anchor 132 is for engaging with the vehicle, e.g., atop attachment disposed on the vehicle. The tether strap 133 is connected to the tether anchor 132 and the tether driving component 131 and is extendable and retractable relative to the tether driving component 131.

However, the present invention is not limited to this embodiment. For example, in another embodiment, the seat body can be fixed onto the base, i.e., the seat body is not removable and not rotatable relative to the base. Alternatively, in another embodiment, the seat body can be slidably disposed on the base and not detachable from the base, and a reclining angle of the seat body relative to the base can be adjusted by a sliding movement of the seat body and the base. Alternatively, in another embodiment, the tether strap can be connected to the tether anchor and the base and routed through the tether driving component.

Specifically, the base 11 is formed in an L-shaped structure and includes a first portion 111 and a second portion 112. The first portion 111 and the second portion 112 respectively abut against a seatback and a seat pan of the seat of the vehicle, and the tether driving component 131 is movably disposed on the first portion 111 of the base 11. An accommodating chamber 113 is formed inside the first portion 111 of the base 11. An accommodating recess 114 is formed on an upper periphery on the first portion 111 of the base 11, and the tether driving component 131 is partially received inside the accommodating chamber 113 and partially exposed out of the accommodating recess 114.

Preferably, in this embodiment, two guiding tracks 115 can be formed on the first portion 111 of the base 11 and located inside the accommodating chamber 113. The tether driving component 131 can include a handle part 1311 connected to the tether strap 133, and the tether driving component 131 can further include two moving parts 1312 connected to the handle part 1311. The handle part 1311 can be exposed out of the accommodating recess 114, and a user can grasp the handle part 1311 to pull or push the two moving parts 1312. The two moving parts 1312 can be respectively at least partially inserted inside the two guiding tracks 115 and slidable relative to the two guiding tracks 115, i.e., the two moving parts 1312 can be at least partially received inside the accommodating chamber 113 and slidable relative to the first portion 111. A shape of the handle part 1311 of the tether driving component 131 can match with a shape of the accommodating recess 114. The handle part 1311 can cover the accommodating recess 114 when the tether driving component 131 is located at the stored position as shown in FIG. 2 and FIG. 4, and the handle part 1311 can separate from the accommodating recess 114 when the tether driving component 131 is located at the used position as shown in FIG. 1 and FIG. 3. However, the present invention is not limited to this embodiment. For example, in another embodiment, there can be only one guiding track and one moving part at least partially inserted into the guiding track and slidable relative to the guiding track.

Besides, the tether assembly 13 can further include a releasing mechanism 134 for allowing and restraining a sliding movement of the tether driving component 131 relative to the base 11. The releasing mechanism 134 can include an operating component 1341, two engaging components 1342, two linking components, two recovering components and two engaging portions 1343. Each engaging components 1342 can be an engaging protrusion or an engaging recess, and each engaging portions 1343 can be an engaging recess or an engaging protrusion, accordingly. The operating component 1341 is movably disposed on the handle part 1311 of the tether driving component 131. The two engaging components 1342 are respectively movably disposed on the two moving parts 1312. The two engaging portions 1343 are respectively formed on the two guiding tracks 115. Each linking component is connected to the corresponding engaging component 1342 and the operating component 1341. Each recovering component is for biasing the corresponding engaging component 1342 to engage with the corresponding engaging portion 1343. The operating component 1341 drives the two engaging components 1342 to respectively disengage from the two engaging portions 1343 for allowing a sliding movement of the two moving parts 1312 relative to the two guiding tracks 115 to allow the sliding movement of the tether driving component 131 relative to the base 11 when the operating component 1341 is operated. The two recovering components drives the two engaging components 1342 respectively to engage with the two engaging portions 1343 for restraining the sliding movement of the two moving parts 1312 relative to the two guiding tracks 115 to restrain the sliding movement of the tether driving component 131 relative to the base 11 when the operating component 1341 is released. However, the releasing mechanism is not limited to this embodiment. For example, in another embodiment, the releasing mechanism can be omitted, i.e., the sliding movement of the tether driving component can be restrained by static friction between each of the moving part and the corresponding guiding track.

Furthermore, as shown in FIG. 1 and FIG. 2, in order to prevent any interference caused by the loosing tether assembly 13, a recess 116 can be formed on an outer side of the first portion 111 of the base 11 for accommodating the tether anchor 132, and a fixing lug 117 can be formed inside the recess 116 to latch the tether anchor 132 accommodated inside the recess 116. The tether anchor 132 can be accommodated inside the recess 116 and latched by the fixing lug 117 for preventing the interference caused by the loosing tether assembly 13 when the tether anchor 132 is disengaged from the vehicle.

Besides, in order to secure a lower portion of the child car seat 1, the base 11 can further include two lower anchors 118 disposed on a connection of the first portion 111 and the second portion 112 for engaging with the vehicle, e.g., a lower attachment disposed on the vehicle. By engagement of the two lower anchors 118 and the vehicle and the tether assembly 13 and the vehicle, the child safety seat can be secured onto the vehicle stably.

Figure 5:
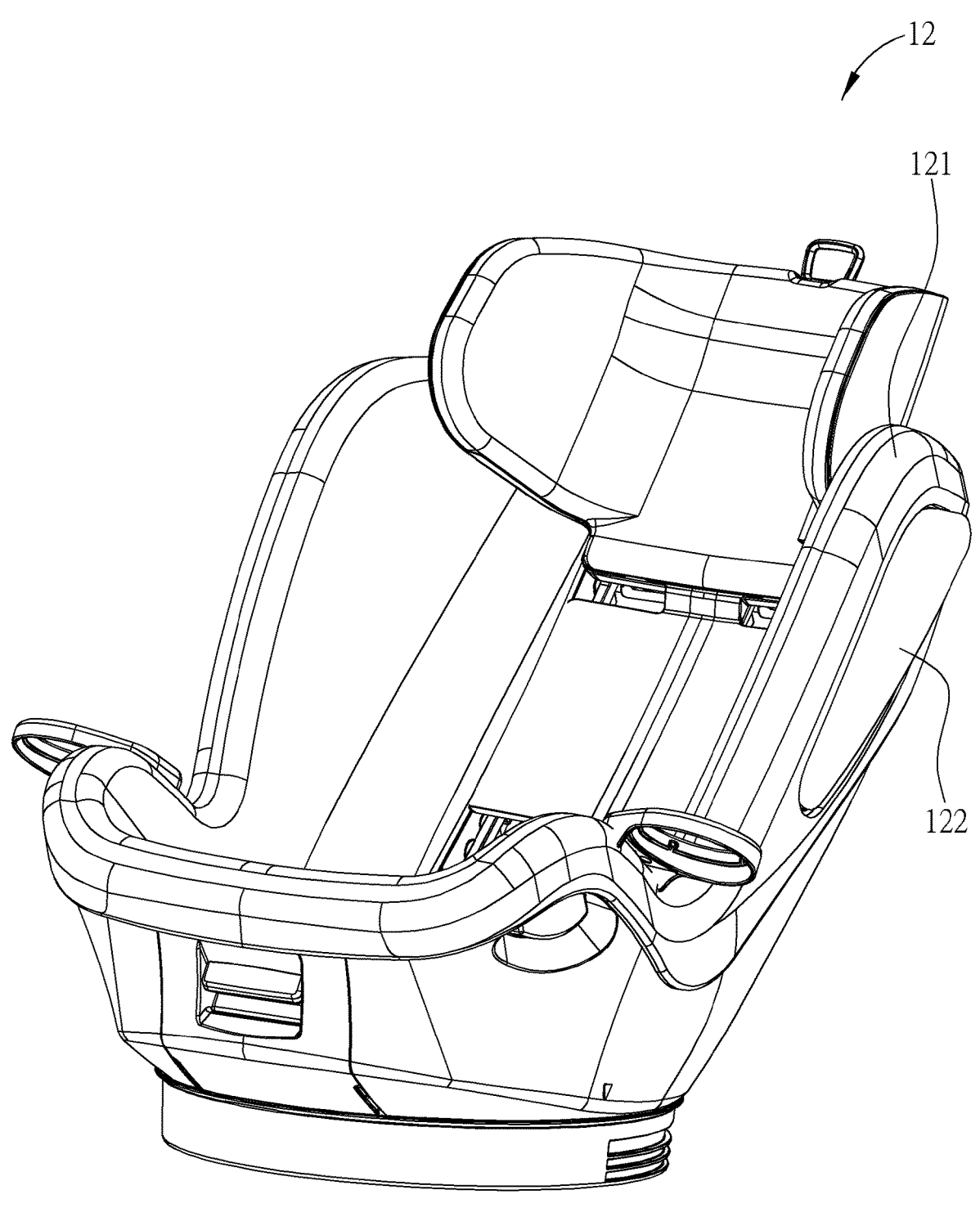
FIG. 5 is a diagram of a seat body according to the first embodiment of the present invention.
Figure 6:
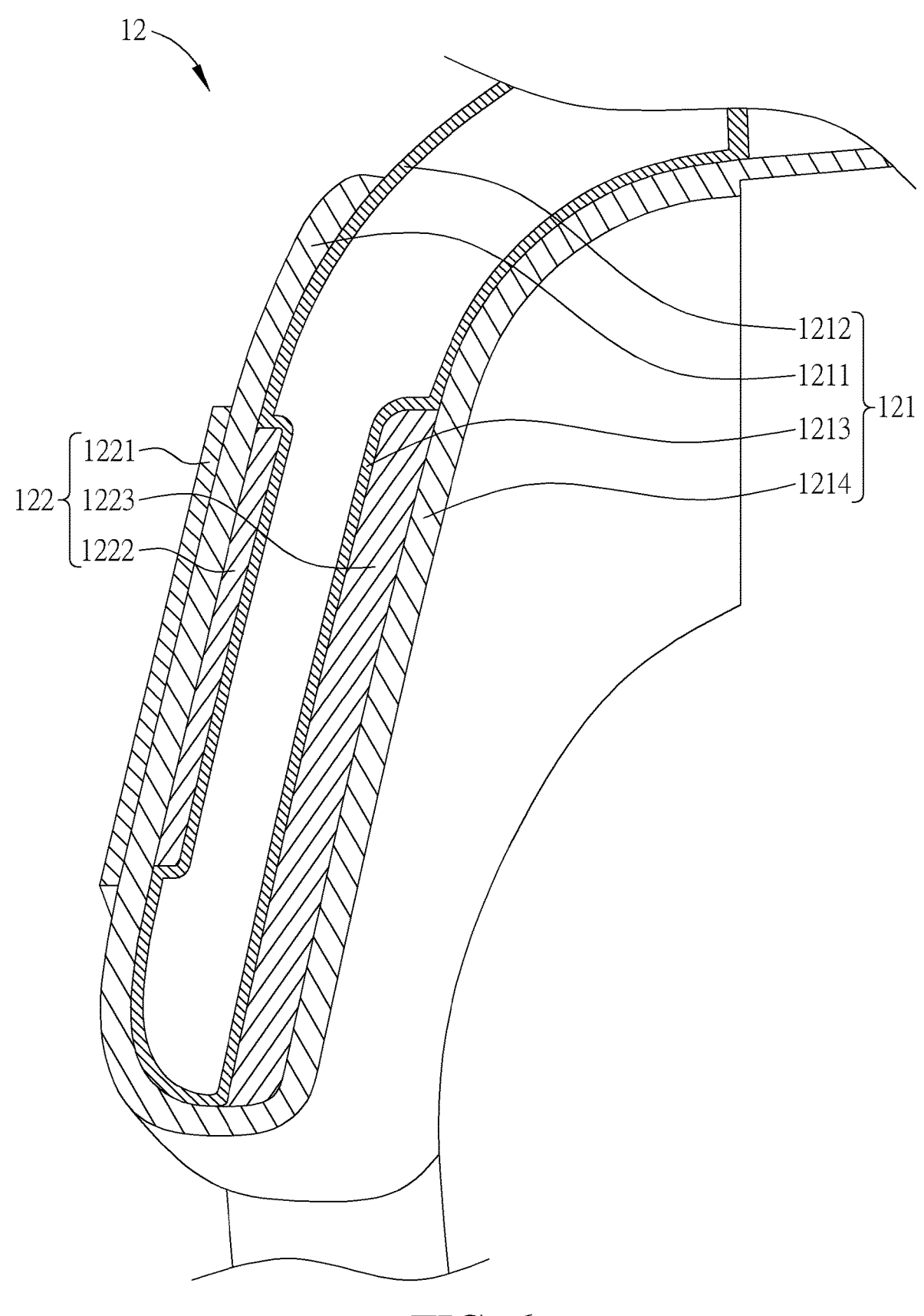
FIG. 6 is a partial internal structural diagram of the seat body according to the first embodiment of the present invention.

In addition, please refer to FIG. 1, FIG. 5 and FIG. 6. FIG. 5 is a diagram of the seat body 12 according to the first embodiment of the present invention. FIG. 6 is a partial internal structural diagram of the seat body 12 according to the first embodiment of the present invention. As shown in FIG. 1, FIG. 5 and FIG. 6, in order to absorb lateral impacts, the seat body 12 includes a shell 121 and two lateral impact pads 122 disposed on two lateral sides of the shell 121. Each side impact pad 122 includes three energy absorbing layers 1221, 1222, 1223. The three energy absorbing layers 1221, 1222, 1223 can be made of fabric, foam, plastic, or rubber, and materials of the three energy absorbing layers 1221, 1222, 1223 can be different or the same. The energy absorbing layer 1221 can be disposed on an outer side of an outer soft layer 1211 disposed on an outer wall 1212 of the shell 121, the energy absorbing layer 1222 can be disposed between the outer soft layer 1211 and the outer wall 1212 of the shell 121, and the energy absorbing layer 1223 can be disposed between an inner wall 1213 of the shell 121 and an inner soft layer 1214 disposed on the inner wall 1213 of the shell 121. However, the number and the configuration of the lateral impact pad are not limited to this embodiment. It depends on practical demands. For example, in another embodiment, each lateral impact pad can include two or more energy absorbing layers which can be disposed from the outer soft layer to the inner soft layer adjacently.

Figure 7:
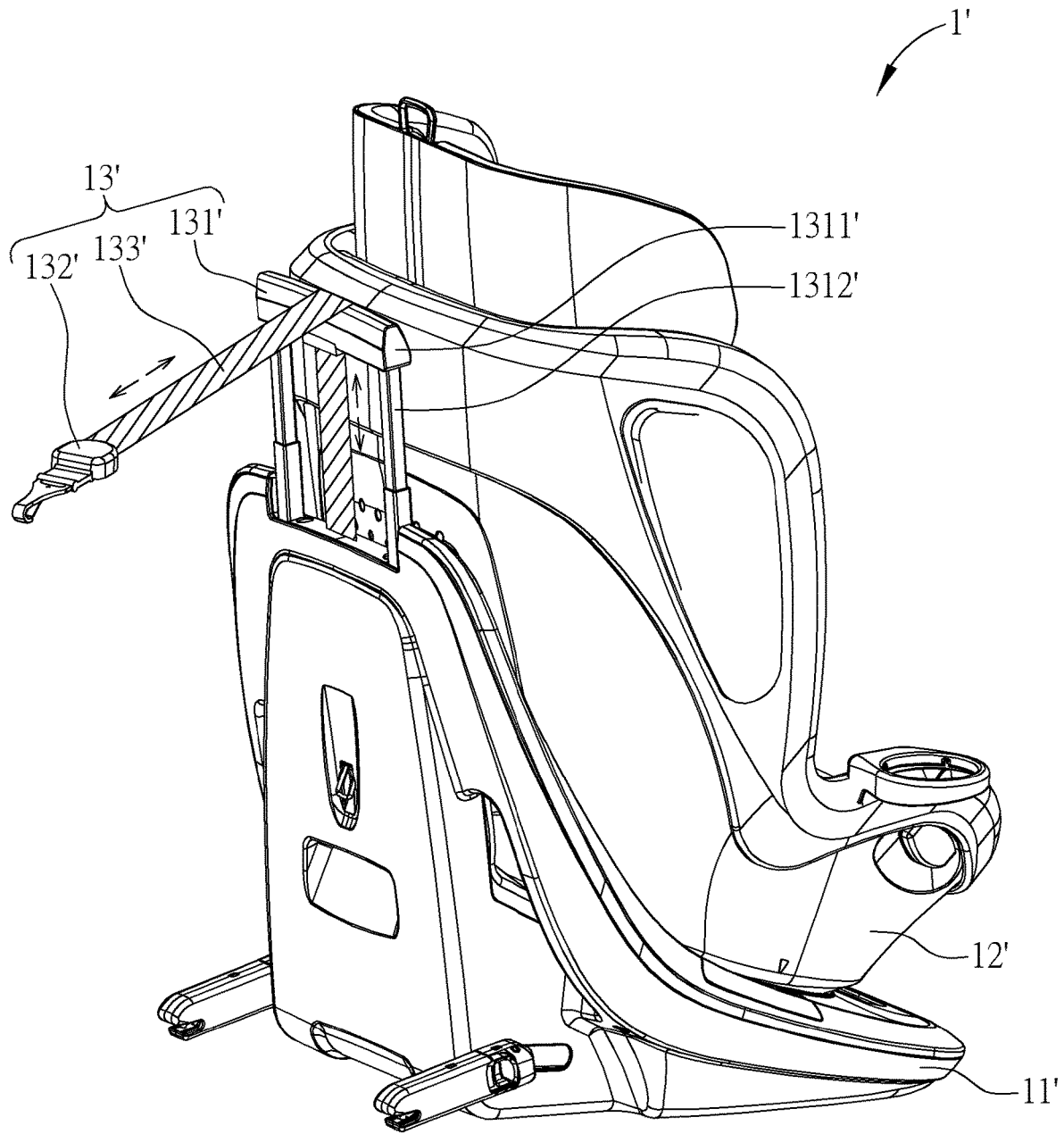
FIG. 7 is a schematic diagram of a child safety seat according to a second embodiment of the present invention.
Figure 8:
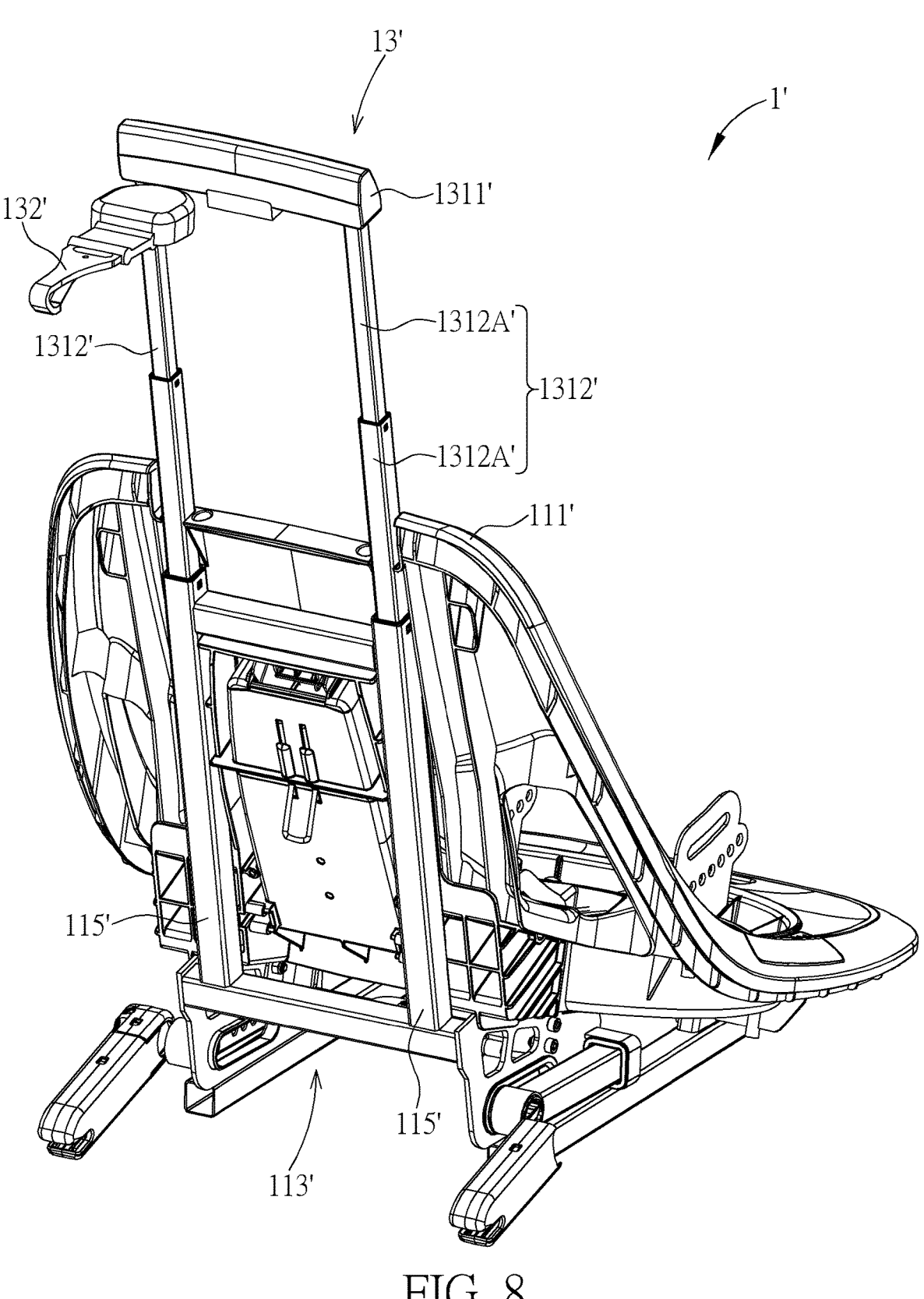
FIG. 8 is a partial internal structural diagram of the child safety seat shown in FIG. 7 according to the second embodiment of the present invention.

Please refer to FIG. 7 and FIG. 8. FIG. 7 is a schematic diagram of a child safety seat 1' according to a second embodiment of the present invention. FIG. 8 is a partial internal structural diagram of the child safety seat 1' shown in FIG. 7 according to the second embodiment of the present invention. As shown in FIG. 7 and FIG. 8, different from the first embodiment, the child safety seat 1' includes a base 11', a seat body 12' and a tether assembly 13'. The base 11' and the seat body 12' of this embodiment are similar to the base 11 and the seat body 12 of the first embodiment. Detailed description for the base 11' and the seat body 12' is omitted herein for simplicity. The tether assembly 13' includes a tether driving component 131', a tether anchor 132' and a tether strap 133'. The tether driving component 131' includes a handle part 1311' and two telescopic parts 1312'. The handle part 1311' is connected to the two telescopic parts 1312' to form a U-shaped structure. Each telescopic part 1312' includes two telescopic portions 1312A' slidably connected to each other in a telescopic manner. The two telescopic portions 1312A' near the base 11' are at least partially inserted inside two guiding tracks 115' disposed inside an accommodating chamber 113' formed inside a first portion 111' of the base 11' and slidable relative to the two guiding tracks 115'. The handle part 1311' is connected to the corresponding two telescopic portions 1312A' away from the base 11'. The tether strap 133' is connected to the first portion 111' of the base 11' and routed through the tether driving component 131', and the tether strap 133' is extendable and retractable relative to base 11'. The tether driving component 131' can be moved between the used position and the stored position by relative movement of the telescopic portions 1312A' and relative movement of the telescopic parts 1312' and the guiding tracks 115'. However, the number and the configuration of the telescopic part are not limited to the ones illustrated in the figures of this embodiment. It depends on practical demands. For example, in another embodiment, the tether driving component can include one telescopic part and a handle part connected to the telescopic part, so as to form a T-shaped structure, and the telescopic part can include three or more telescopic portions.

Figure 9:
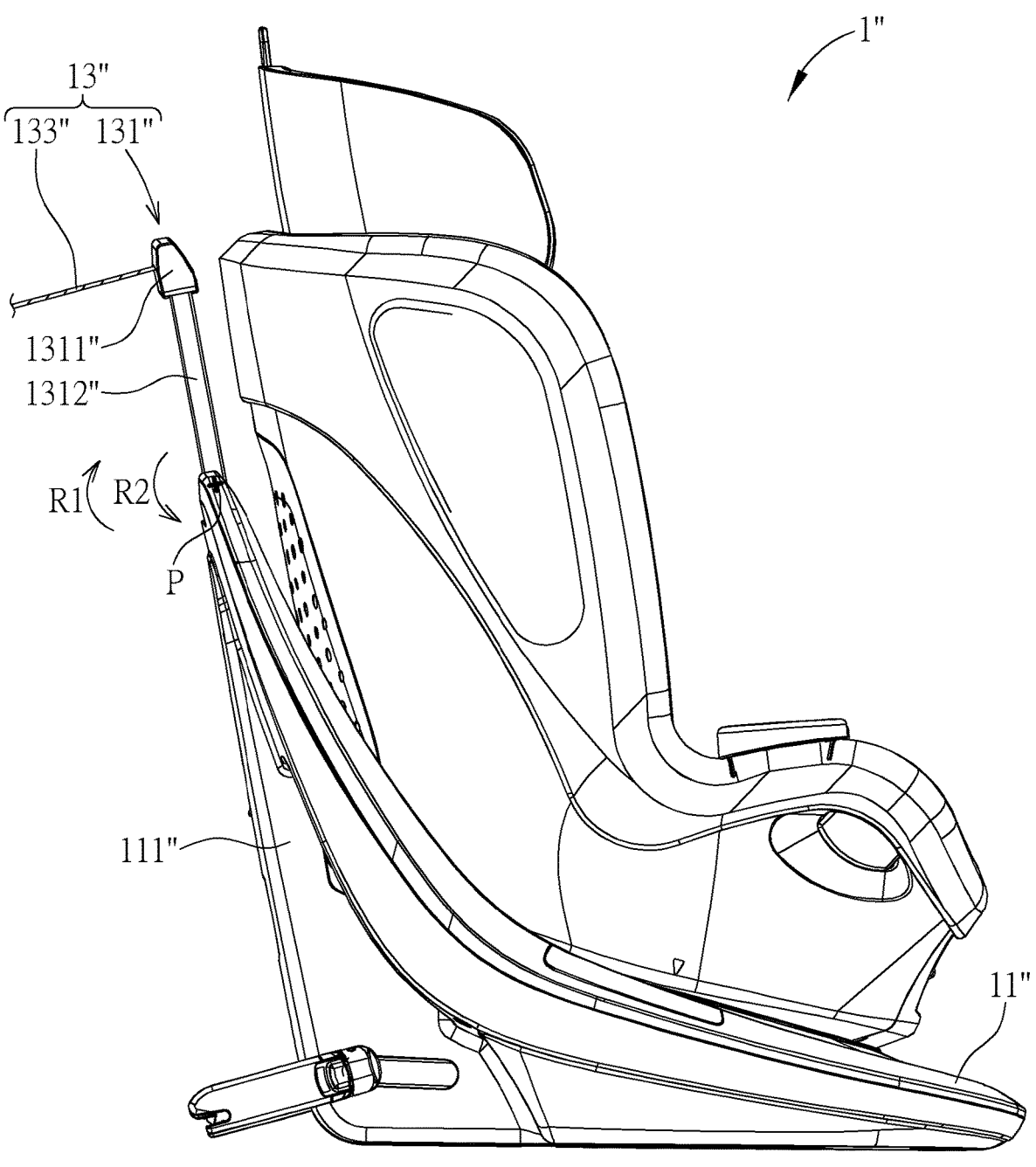
FIG. 9 is a partial lateral view diagram of a child safety seat according to a third embodiment of the present invention.

Please refer to FIG. 9. FIG. 9 is a partial lateral view diagram of a child safety seat 1" according to a third embodiment of the present invention. As shown in FIG. 9, different from the aforementioned embodiments, the child safety seat 1" includes a base 11", a seat body 12" and a tether assembly 13". The tether assembly 13" includes a tether driving component 131", a tether anchor, which is not shown in the figure, and a tether strap 133". The tether driving component 131" includes a handle part 1311" and a moving part 1312". The moving part 1312" is pivotally connected to a first portion 111" of the base 11" around a pivoting axis P, so that the tether driving component 131" can be pivotally extended relative to the first portion 111" of the base 11" along a first pivoting direction R1 and pivotally retracted relative to the first portion 111" of the base 11" along a second pivoting direction R2 opposite to the first pivoting direction R1. The tether strap 133" is fixedly connected to the handle part 1311" of the tether driving component 131" and the tether anchor, i.e., the tether strap 133" is not extendable or retractable relative to the tether driving component 131". Other structures of this embodiment are similar to the ones of the first embodiment. Detailed description is omitted herein.

In contrast to the prior art, in the present invention, the tether driving component is extendable and retractable relative to the base between the used position and the stored position. Therefore, the present invention achieves an aesthetic design of the base and maintains a lower profile and a lower center of gravity while providing a proper height adjustment for crash performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat comprising:
   a base installable on a seat of a vehicle, the base having a body including a first portion positionable in contact with a seatback of the seat of the vehicle and a second portion positionable in contact with a seat pan of the seat of the vehicle;
   a seat body movably, detachably, or fixedly disposed on the base and for accommodating a child; and
   a tether assembly for securing the base on the seat of the vehicle, the tether assembly comprising:
      a tether driving component movably disposed on the base and including a handle part, the tether driving component being extendable relative to the base to a used position and retractable relative to the base to a stored position while the seat body is disposed on the base, the handle part of the tether driving component in the used position being higher than the handle part of the tether driving component in the stored position relative to the seat body;
      a tether anchor engageable with the vehicle; and
      a tether strap connected to the tether anchor and associated with the handle part of the tether driving component;
      wherein the handle part forms an upper end of the tether assembly, and the tether strap extends directly from the handle part.

2. The child safety seat of claim 1, wherein the base is formed in an L-shaped structure and comprises a first portion and a second portion, the first portion and the second portion respectively abut against a seatback and a seat pan of the seat of the vehicle, and the tether driving component is movably disposed on the first portion of the base.

3. The child safety seat of claim 2, wherein an accommodating chamber is formed inside the first portion of the base, an accommodating recess is formed on an upper periphery on the first portion of the base, and the tether driving component is partially received inside the accommodating chamber and partially exposed out of the accommodating recess.

4. The child safety seat of claim 3, wherein the tether driving component comprises at least one moving part connected to the handle part, the handle part is exposed out of the accommodating recess, the at least one moving part is at least partially received inside the accommodating chamber and slidable relative to the first portion, a shape of the handle part of tether driving component matches with a shape of the accommodating recess, the handle part covers the accommodating recess when the tether driving component is located at the stored position, and the handle part separates from the accommodating recess when the tether driving component is located at the used position.

5. The child safety seat of claim 2, wherein a recess is formed on an outer side of the first portion of the base for accommodating the tether anchor.

6. The child safety seat of claim 2, wherein the base further comprises at least one lower anchor disposed on a connection of the first portion and the second portion.

7. The child safety seat of claim 1, wherein the tether driving component is slidably or pivotally disposed on the base.

8. The child safety seat of claim 7, further comprising a releasing mechanism having an operating component associated with the handle part, the releasing mechanism being transformable between a first configuration and a second configuration, wherein the releasing mechanism allows and restrains a sliding movement or a pivoting movement of the tether driving component relative to the base.

9. The child safety seat of claim 7, wherein the handle part is connected to the tether strap and at least one moving part connected to the handle part and slidably or pivotally disposed on the base.

10. The child safety seat of claim 1, wherein the tether driving component further comprises a telescopic part, the telescopic part comprises a plurality of telescopic portions movably connected to each other in a telescopic manner, and the handle part is connected to the tether strap and one of the plurality of the telescopic portions away from the base.

11. The child safety seat of claim 1, wherein the tether strap is extendable and retractable relative to the tether driving component.

12. A tether assembly for securing a base of a child safety seat installed on a seat of a vehicle, the tether assembly comprising:

a tether driving component movably disposable on a portion of the base positionable in contact with a seat back of the seat of the vehicle, the tether driving component including a handle part, the tether driving component being extendable relative to the base to a used position and retractable relative to the base to a stored position while the seat body is disposed on the base, the handle part of the tether driving component in the used position being higher than the handle part of the tether driving component in the stored position along a vertical direction;

a tether anchor engageable with the vehicle; and a tether strap connected to the tether anchor and associated with the handle part of the tether driving component;

wherein the handle part forms an upper end of the tether assembly, and the tether strap extends directly from the handle part.

13. The tether assembly of claim 12, wherein the tether driving component is movably disposed on a first portion of the base abutting against a seatback of the seat of the vehicle.

14. The tether assembly of claim 13, wherein the tether driving component is partially received inside an accommodating chamber formed inside the base and partially exposed out of an accommodating recess formed on an upper periphery of the base.

15. The tether assembly of claim 14, wherein the tether driving component comprises at least one moving part connected to the handle part, the handle part is exposed out of the accommodating recess, the at least one moving part is at least partially received inside the accommodating chamber and slidable relative to the first portion, a shape of the handle part of tether driving component matches with a shape of the accommodating recess, the handle part covers the accommodating recess when the tether driving component is located at the stored position, and the handle part separates from the accommodating recess when the tether driving component is located at the used position.

16. The tether assembly of claim 12, wherein the tether driving component is slidably or pivotally disposed on the base.

17. The tether assembly of claim 16, further comprising a releasing mechanism having an operating component associated with the handle part, the releasing mechanism being transformable between a first configuration and a second configuration, wherein the releasing mechanism allows and restrains a sliding movement or a pivoting movement of the tether driving component relative to the base.

18. The tether assembly of claim 16, wherein the handle part is connected to the tether strap and at least one moving part connected to the handle part and slidably or pivotally disposed on the base.

19. The tether assembly of claim 12, wherein the tether driving component further comprises a telescopic part the telescopic part comprises a plurality of telescopic portions movably connected to each other in a telescopic manner, and the handle part is connected to the tether strap and one of the plurality of the telescopic portions away from the base.

20. The tether assembly of claim 12, wherein the tether strap is extendable and retractable relative to the tether driving component.

21. The tether assembly of claim 12, wherein the base defines an accommodating chamber, and wherein at least a portion of the tether driving component is extendable out of the accommodating chamber to a used position, and retractable into the accommodating chamber to a stored position.

22. The tether assembly of claim 12, wherein a top surface of the handle part is flush with an upper surface of the support base in the stowed position.

23. The child safety seat of claim 1, wherein the base defines an accommodating chamber, and wherein at least a portion of the tether driving component is extendable out of the accommodating chamber to a used position, and retractable into the accommodating chamber to a stored position.

24. The child safety seat of claim 1, wherein a top surface of the handle part is flush with an upper surface of the support base in the stowed position.

* * * * *